(No Model.)
G. ECKEL.
ATTACHMENT FOR SECURING STOVE PIPES IN FLUE THIMBLES.
No. 268,646. Patented Dec. 5, 1882.
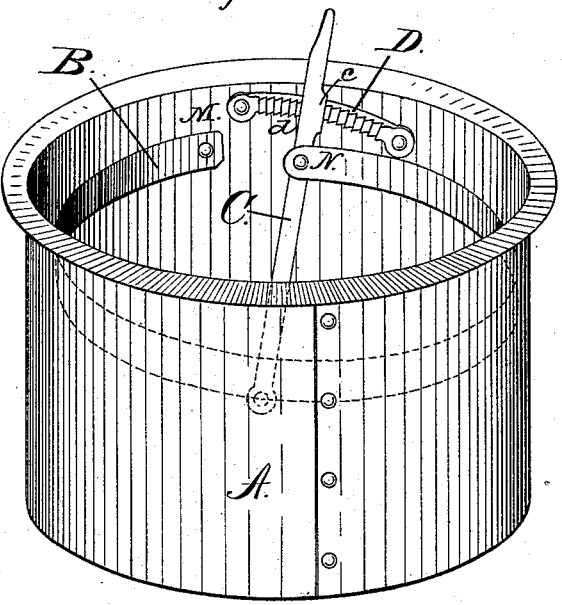
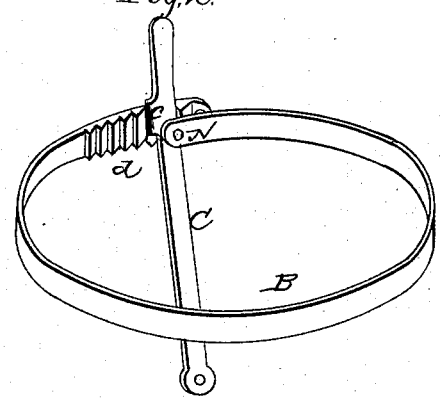
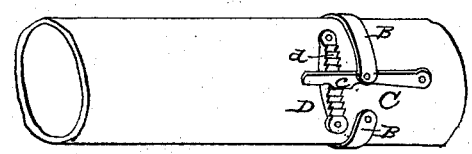
Witnesses,
Harrison Ogborn
Everett A Eckel
Inventor:
George Eckel

UNITED STATES PATENT OFFICE.

GEORGE ECKEL, OF RICHMOND, INDIANA.

ATTACHMENT FOR SECURING STOVE-PIPES IN FLUE-THIMBLES.

SPECIFICATION forming part of Letters Patent No. 268,646, dated December 5, 1882.

Application filed September 28, 1882. (No model.)

*To all whom it may concern:*

Be it known that I, GEORGE ECKEL, a citizen of the United States, residing at Richmond, in the county of Wayne and State of Indiana, have invented certain new and useful Improvements in Attachments for Securing Stove-Pipes in Flue-Thimbles; and I do hereby declare the following to be a full, clear, and exact description of the invention, such as will enable others skilled in the art to which it appertains to make and use the same.

This invention relates to certain new and useful improvements in attachments for securing stove-pipes in flue-thimbles; and the invention consists in novel features of construction and combination and arrangement of parts, all as will be hereinafter fully described, and set forth in the claims hereto annexed.

Referring to the accompanying drawings, Figure 1 is an enlarged view in perspective, showing my improvement as applied to the flue-thimble; Figs. 2 and 3, detail views, to be hereinafter referred to.

In the drawings, A represents the usual flue-thimble, and B a metallic strap arranged therein, and having one end secured at the point M, and which strap passes nearly around the interior surface of said flue-thimble and has its free end connected to a lever, C, at the point N. The lever C is fulcrumed at its inner end within said flue-thimble, while its free end projects a short distance outside thereof, by which it may be operated. This lever is also provided with a pawl, c, adapted to engage the teeth d of a ratchet-plate secured to the inner side of the flue-thimble, whereby when said lever is operated for adjusting the metallic strap B it may be secured in any position desired, all as clearly shown in Fig. 1.

Fig. 2 represents a similar attachment to that shown in Fig. 1, with the exception of dispensing with the ratchet-plate D and forming the teeth d on the end of the metallic strap, which strap is lengthened enough to reach the lever C, so that the pawl c thereon may engage the teeth.

Fig. 3 shows a similar attachment to that shown in Fig. 1, connected to the exterior of the pipe, so that it may be expanded and press against the interior surface of flue-thimble, thus securing the pipe therein. This arrangement is also applicable to stove-pipe joints in order to make a smaller pipe fit a larger pipe by expanding the strap the same as in the flue-thimble.

It will be readily observed from the foregoing that the stove-pipe can be secured in the flue-thimble by contracting or expanding the strap B, and held in any desired position by the lever, pawl, and ratchet arrangement.

By having the strap B of the attachment passing nearly or entirely around the flue-thimble on its inner side, or around the pipe when placed therein, I am enabled to more perfectly produce a proper tension upon the pipe for securing it in position.

Having thus fully described my invention, what I claim as new, and desire to secure by Letters Patent, is—

1. The combination, with a flue-thimble or stove-pipe, of a metallic strap connected thereto at one end and passing nearly or entirely around the same, as shown, and a pivoted lever connected to its other end, and means for securing it in any position to which it may be moved for adjusting said strap, substantially as and for the purpose specified.

2. The combination, with a flue-thimble or stove-pipe, of a metallic strap, B, connected thereto at one end and passing nearly or entirely around the same, as shown, and a pivoted lever provided with a pawl for engaging ratchet-teeth to secure the strap when adjusted, substantially as and for the purpose specified.

3. The combination, with the flue-thimble or stove-pipe, of a metallic strap having ratchet-teeth thereon, connected at one end thereto, and passing entirely around the same, and a pivoted lever connected to the other end of said strap and having a pawl for engaging said teeth, for securing the strap in its adjusted positions, substantially as and for the purpose specified.

In testimony whereof I affix my signature in presence of two witnesses.

GEORGE ECKEL.

Witnesses:
 J. ED. ILIFF,
 GEORGE COALE.